United States Patent [19]

Spigarelli et al.

[11] 4,389,797
[45] Jun. 28, 1983

[54] CONTINUOUS VAPOR PROCESSING SYSTEM

[75] Inventors: Donald J. Spigarelli, Carlisle; Paul C. Dustin, Reading, both of Mass.

[73] Assignee: The HTC Corporation, Concord, Mass.

[21] Appl. No.: 276,493

[22] Filed: Jun. 23, 1981

[51] Int. Cl.³ .............................................. F26B 21/06
[52] U.S. Cl. ........................................... 34/73; 34/78;
    118/61; 118/729; 118/733; 118/58
[58] Field of Search .............. 118/733, 732, 729, 715,
    118/719, 61, 68, 718, 58; 427/345; 34/78, 73;
    134/107, 108; 228/240, 242, 180 R

[56] References Cited

U.S. PATENT DOCUMENTS

| | | | |
|---|---|---|---|
| 3,000,346 | 9/1961 | Hnilicka, Jr. | 118/719 X |
| 3,408,748 | 11/1968 | Dunn, Jr. | 34/78 X |
| 3,904,102 | 9/1975 | Chu et al. | 134/107 X |
| 3,996,949 | 12/1976 | Boynton | 134/108 X |
| 4,277,518 | 7/1981 | Schillke et al. | 118/69 X |

Primary Examiner—John D. Smith
Assistant Examiner—Bernard F. Plantz
Attorney, Agent, or Firm—Weingarten, Schurgin, Gagnebin & Hayes

[57] ABSTRACT

A continuous vapor processing system for vapor phase soldering, degreasing, or similar processes wherein a product is moved into and out of a vessel in a continuous manner via open conduits or channels while preventing escape of vapor from the processing tank and the conduits.

17 Claims, 5 Drawing Figures

CONTINUOUS VAPOR PROCESSING SYSTEM

FIELD OF THE INVENTION

This invention relates to vapor phase soldering, degreasing, and like systems and, more particularly, to continuous systems open to the atmosphere and having apparatus for conservation and emission control of process vapor.

BACKGROUND OF THE INVENTION

Vapor phase systems are known in which a processing vapor is contained in a vessel and into which a product is introduced to accomplish a particular process or operation. One such system is for vapor phase soldering wherein solder on a workpiece is caused to melt or reflow by the heat from a condensing heated vapor. In such a vapor phase soldering system, a fluorocarbon liquid is typically provided in a tank and is heated to a temperature sufficient to produce a hot saturated vapor above the surface of the liquid and in equilibrium therewith. This liquid preferably is a nonconducting chemically stable inert liquid having an atmospheric boiling point at least equal to the soldering temperature and which provides non-oxidizing, non-flammable vapor. The tank is usually open to the atmosphere to facilitate product entry and removal, and the vapor can emanate from the open tank into the atmosphere. The release of process vapor into the atmosphere can present a health risk, and the magnitude of such emissions are becoming the subject of increasingly stringent governmental and industry health and safety standards. Moreover, the liquid providing the vapor is relatively expensive, and thus for economy of system operation, loss of the liquid through vapor emission into the atmosphere should also be minimized.

One technique for minimizing vapor loss is shown in U.S. Pat. No. 3,904,102 wherein a secondary vapor blanket is provided over the primary or processing vapor to shield the primary vapor from the atmosphere. The secondary vapor blanket is most typically formed of Freon TF (R-113) which stratifies above the primary vapor by virtue of a lower boiling point and a lower density than the primary vapor. Such a dual vapor system presents several disadvantages. The system is inherently more complex than single vapor systems by reason of the additional cooling and recovery equipment required for the secondary fluid. The secondary vapor is not in contact with its own boiling phase but rather is exposed to the higher temperature primary vapor; thus, the second vapor is caused to exist at a superheated temperature, usually about 180°-225° F., which causes breakdown of the material into components which can be toxic and corrosive. Acid contaminants can form in the secondary vapor, which can affect the processing system and add to the cost of its maintenance. The presence of acid contaminants in the secondary vapor can also result in contamination of the product entering and leaving the system by way of the secondary vapor blanket. Such acid contaminants exist in the secondary vapor to some degree even when employing acid removal procedures on the condensed secondary liquid. Moreover, the boiling phase of the primary liquid can generate pollutants such as perfluoroisobutylene (PFIB) which can enter the atmosphere.

Systems have been proposed using tank covers to contain the processing vapor, however, vapor loss still occurs when the cover is opened to admit product entry and removal. An improved system for minimizing the problems of vapor loss is shown in U.S. Pat. No. 4,077,467 of one of the same inventors and the same assignee as herein. In the system therein described, the primary and secondary liquids are separated and contained within closed individually controlled vapor-lock chambers. The separate chambers prevent the vapors from communicating with each other, inhibit the flow of contaminants, minimize vapor loss and avoid fluid breakdown due to excessive heating. The separation of the chambers is achieved by movable doors which sequentially open to admit the work and close behind the work; after the soldering is completed, the doors operate in reverse sequence. However, this added equipment complexity somewhat hampers the vapor phase soldering operations in an automated manufacturing facility. Furthermore, to a lesser extent, some of the above-mentioned vapor loss problems persist.

A system showing the continuous passage of articles into and out of the vessel containing the vapor is shown in U.S. Pat. No. 3,866,307, wherein the process vessel includes an inlet conduit and an exit conduit, each disposed at the top of the vessel above the vapor zone, and each having cooling coils which assist in retaining the vapor within the vessel. Articles to be processed are conveyed in a curved path downward from the inlet conduit into the vapor and upward from the vapor to the outlet conduit. This apparatus has application to manufacturing processes, generally limited to where the vapor entry and exit and curved path are permissible. Vapor loss can also occur from the relatively large inlet and outlet ports.

SUMMARY OF THE INVENTION

The present invention comprises a continuous vapor processing system open to the atmosphere and wherein a product is moved into, through, and out of a vessel in a continuous manner via open conduits without significant loss of vapor to the atmosphere. The system comprises a vessel containing a liquid which is heated to produce a vapor within a controlled zone and conduits which extend outwardly from the vessel sides, each having a channel therethrough which communicates at its inner end with the vessel interior within the vapor zone, and at its outer end with the atmosphere. The conduit channels are configured to allow passage of a product therealong while minimizing vapor flow. Preferably, cooling means are disposed at the apertures at which the conduits join the vessel to cause condensation of the vapor at the conduit entrances and minimize the flow of vapor outward through the conduits. Additional cooling means are provided along the conduits to condense vapor that has entered the conduit channels, to substantially minimize vapor loss from the conduits to the atmosphere.

A product can be moved into and out of the vessel in a continuous manner by way of the open conduits, typically by means of conveyors disposed within the conduits and within the vessel to accomplish product transport into and out of the processing zone. The invention can be embodied in a single vapor system or in a dual vapor system wherein a secondary vapor is provided above the primary vapor zone to prevent loss of the primary vapor from an open vessel top. A secondary vapor zone can also be created within the conduits to isolate the primary vapor from the open conduit ends. A horizontal orientation of the open conduits is usually preferred to permit linear conveyance of work through the processing system. The conduits can also be inclined either upward or downward to suit intended product transport paths. Upward incline of the conduits also aids in vapor retention of the heavier-than-air vapor.

BRIEF DESCRIPTION OF THE DRAWINGS

The invention will be more fully understood from the following detailed description in conjunction with the accompanying drawing, wherein.

DETAILED DESCRIPTION OF THE INVENTION

Figure 1:
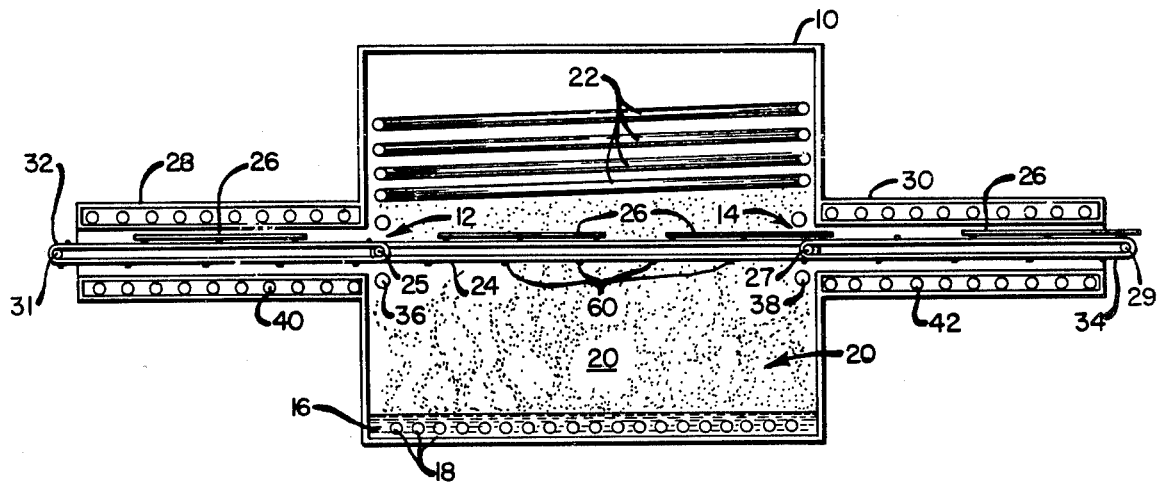
FIG. 1 is a sectional elevation view of an embodiment of a continuous vapor processing system according to the invention.

Referring to FIG. 1, there is shown a closed vessel 10 having apertures 12 and 14 at the sides, by which the work 26 is introduced into and removed from the vessel for processing therein. The vessel 10 contains a liquid 16 which is heated by heaters 18 to produce a vapor 20 within the vessel. The vapor 20 is cooled by cooling coils 22 which cause the vapor to remain in a controlled zone through which the work will pass. Conduits 28 and 30 each extend horizontally outward from the vessel 10 and are in communication with respective apertures 12 and 14. The conduits include conveyors 32 and 34, respectively, and work is transported by conveyor 32 into the vapor zone, by conveyor 24 through the zone, and by conveyor 34 from the vapor zone.

A cooling coil 36 is disposed around aperture 12, and a cooling coil 38 is disposed around aperture 14 to minimize the amount of vapor entering the respective conduits 28 and 30. Cooling coils 40 and 42 are provided along the length of respective conduits 28 and 30, and are operative to condense the vapor that flows from the vapor zone in vessel 10 into the conduit channels and prevent vapor loss from the channels to the atmosphere. The cooling coils 40 and 42 can extend along the full length of the respective conduits, or a portion thereof, depending upon the degree of cooling necessary in specific apparatus to achieve vapor condensation. The channels are relatively long and of small cross-section to impede vapor flow. The apertures 12 and 14 and the channels within conduits 28 and 30 are of cross-section which is as small as practical for transport of work therethrough while minimizing the amount of vapor flow. The cooling coils 36 and 38 cause preferential condensation thereon, thereby reducing vapor flow into the conduits, and the cooling coils 40 and 42 are operative to cool and condense the vapor that does enter the conduit channels, to prevent escape of any appreciable amount of vapor from the outer ends of the conduits. In the illustrated embodiment having horizontal conduits, the bottom wall of each conduit can be downwardly sloped toward the vessel to permit gravity flow of condensed vapor in the conduits back into the vessel to be reheated and revaporized. It will be appreciated that work 26 can be continuously processed through the vessel at a rate determined by the speed of the conveyors 32, 24, and 34.

Figure 2:
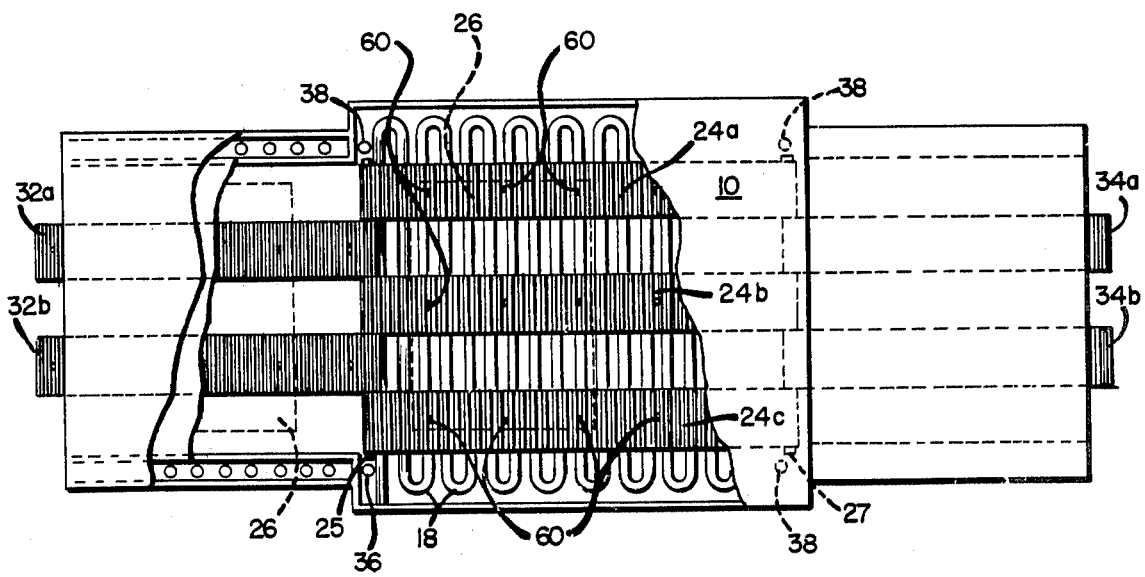
FIG. 2 is a top view of the system of FIG. 1.

The conveyors are more particularly illustrated in FIG. 2. The conveyor 24 within the vessel 10 comprises three parallel conveyor belts 24a, 24b, and 24c which are disposed in parallel spaced relationship within the vessel and are movable about shafts 25 and 27. The conveyor 32 comprises a pair of belts 32a and 32b which are disposed within the spaces provided by the spaced belts 24. The belts 32a and 32b are movable on shaft 25 and a shaft 31 (FIG. 1) disposed at the outer end of conduit 28. The conveyor 34 also comprises a pair of belts 34a and 34b which are disposed within the spaces between belts 24 and movable about shaft 27 and a shaft 29 (FIG. 1) provided at the outer end of the conduit 30. The conveyor belts are operated in unison by a drive mechanism (not shown) to transport the work 26 in a path through conduit 28, the vapor zone of vessel 10, and conduit 30. The conveyor speed can be controlled such that the work is present within the vapor zone for a time suitable to the particular process being performed therein.

Figure 3:
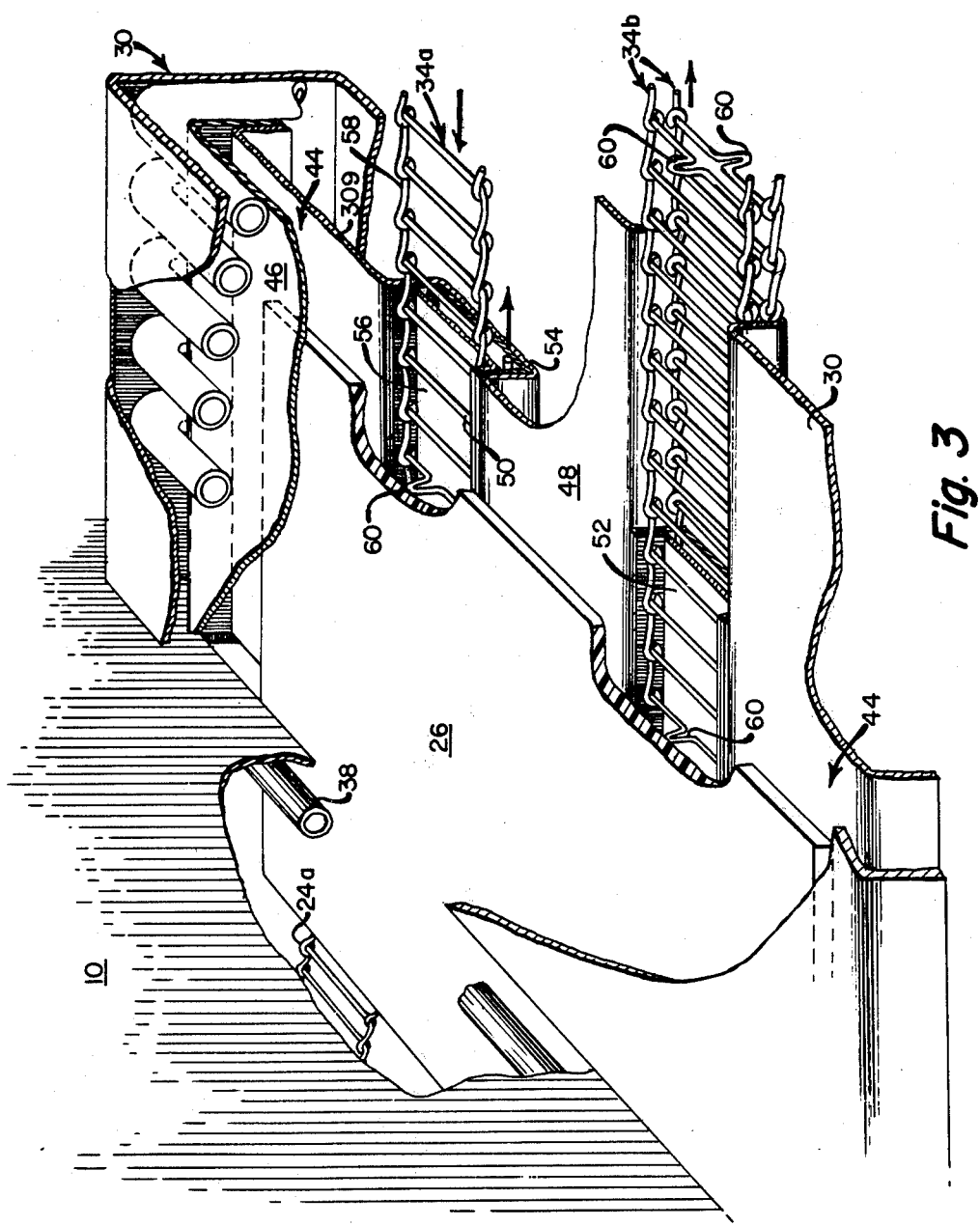
FIG. 3 is a pictorial view, partly cutaway and in section, of a conduit of the system of FIGS. 1 and 2.

The construction of the conduit and the disposition of the conveyors therein is illustrated in FIG. 3. For purposes of discussion, the conduit 30 is shown, it being understood that the conduit 28 is of the same construction. The conduit 30 includes a generally rectangular channel 44 formed by top wall 46 and bottom wall 48. The channel is configured to accommodate the product 26 transported therethrough. In the illustrated embodiment, the channel is a narrow slit to accept a thin sheet product such as printed circuit boards. A pair of recessed channels 50 and 52 are provided in bottom wall 48 to accommodate the respective conveyor belts 34a and 34b. Each conveyor channel includes a bottom floor 54 and an intermediate floor 56 on which the respective courses of the associated conveyor belt are disposed for travel within the channel. The channels are sufficiently deep to permit the respective conveyor belts to be retained at or just below the surface of wall 48. The conveyor belts themselves are of known construction and comprise a plurality of substantially identical wire link elements 58 which are interlocking and pivotable about adjacent links. The belts include raised link portions 60 at regularly spaced intervals along the belt and which serve as supports on which the work 26 rests. The work is thus supported at spaced points off the surfaces of the conduit channels. Alternatively, the raised link portions can be arranged to engage confronting edges of the work product 26 to propel the work through the entrance channel and restrain work against sliding in the exit channel.

The spaced belts 34 are driven on a common shaft with the spaced belts 24 which, in turn, are driven on a common shaft with the spaced belts 32. The belts 24 move about a closed loop path disposed wholly within the vapor processing zone of the vessel 10. The belts 24 thus remain at a uniform temperature present within the vapor zone and also remain exposed to the controlled atmosphere within the vessel. The conveyors 32 and 34 are within the relatively cooler environment of the respective conduits and do not materially affect the temperature control of the processing vapor within the vessel.

The embodiment of FIGS. 1-3 in a typical implementation for the processing of printed circuit boards or other similar thin sheet-like products, has a narrow rectangular channel in each conduit which is about 18½ inches wide and about ¼ to ½ inch in height. In the absence of the cooling coils 36 and 38 at the entrance apertures of the respective conduits, the fluid dynamics for the dimensions set forth will result in vapor loss from the vessel into each conduit of about 3 percent for a ¼ inch channel height, and about 5 percent for a ½ inch channel height. The cooling coils 36 and 38 are significantly cooler than that of the vapor, and the vapor is caused to preferentially condense on the coils 36 and 38, as a result of which vapor loss into the conduits is reduced from the percentages given above. The coils 36 and 38 are maintained at a temperature to provide the preferential condensation without substantial effect on the temperature of the heated processing vapor. The relatively small amount of vapor which does flow from the processing zone into the conduits is condensed within the conduits by action of the cooling coils disposed along the conduit such that no significant vapor loss occurs from the open outer ends of the conduits. The length of the conduits is determined to provide the intended flow resistance to impede outward flow of vapor along the conduit, and to allow sufficient cooling of vapor along the conduit length. A conduit length of 4 to 6 feet is typical. In some instances, forced cooling along the conduit may not be necessary to minimize the escape of vapor from the conduit end. The length can be sufficient to minimize such escape by natural cooling along the conduit and the inhibition of flow by the conduit length and cross-section.

While the embodiment described above employs conduits which are horizontal, the invention may also be implemented by conduits which are inclined upward or downward from the vessel. Moreover, the invention can be employed in dual vapor systems as well as in single vapor systems, such as when the aspect ratio of the conduit channels does not allow full vapor control.

Figure 4:
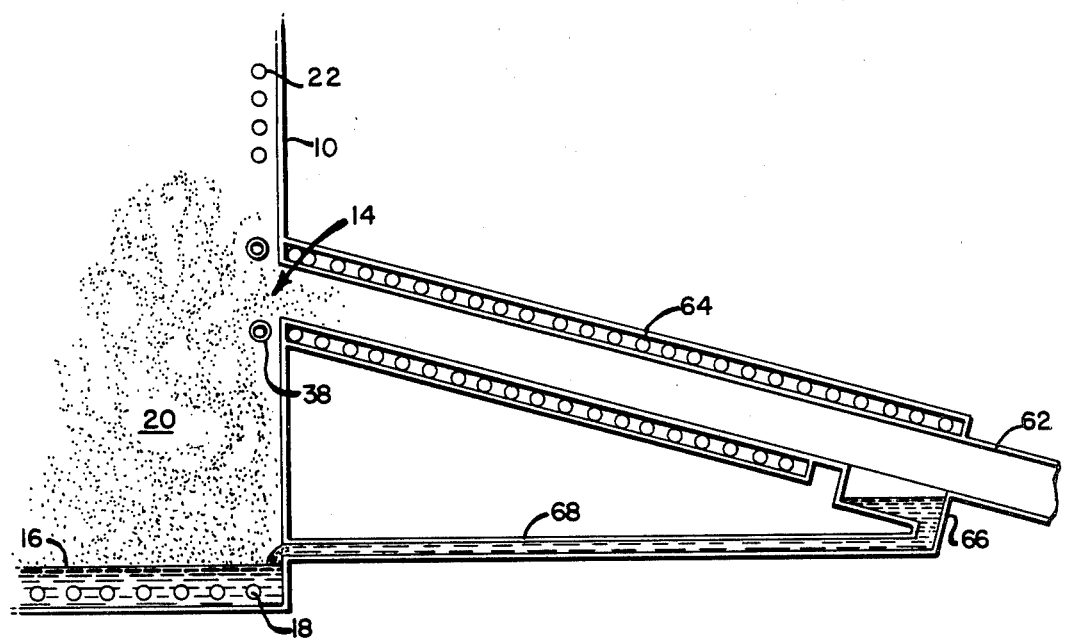
FIG. 4 is a cutaway sectional elevation view of an embodiment of the invention having a downward sloping conduit and condensed vapor recovery apparatus.

An alternative embodiment is shown in FIG. 4 wherein a conduit 62 is shown downwardly disposed from vessel 10. The vapor 20 is more dense than air and the downward slope of the conduit will increase the tendency of outward vapor flow and escape from the conduit end. By virtue of the invention, however, vapor loss is minimized to prevent any appreciable escape from the conduit. Cooling coils 64 are disposed around the conduit along the length thereof. A sump 66 is provided in the bottom of the conduit at a position outward from the vessel, and a return pipe 68 connects the sump 66 with the vessel 10 to permit condensed vapor to be returned to the vessel for reheating and revaporization. In operation, vapor which enters the conduit via aperture 14 is cooled and condensed by cooling means 64, and the condensing liquid is collected in sump 66 for return to the vessel. The cooling action is controlled to achieve condensation of substantially all vapor in the conduit such that no appreciable vapor escapes from the outer conduit end.

Figure 5:
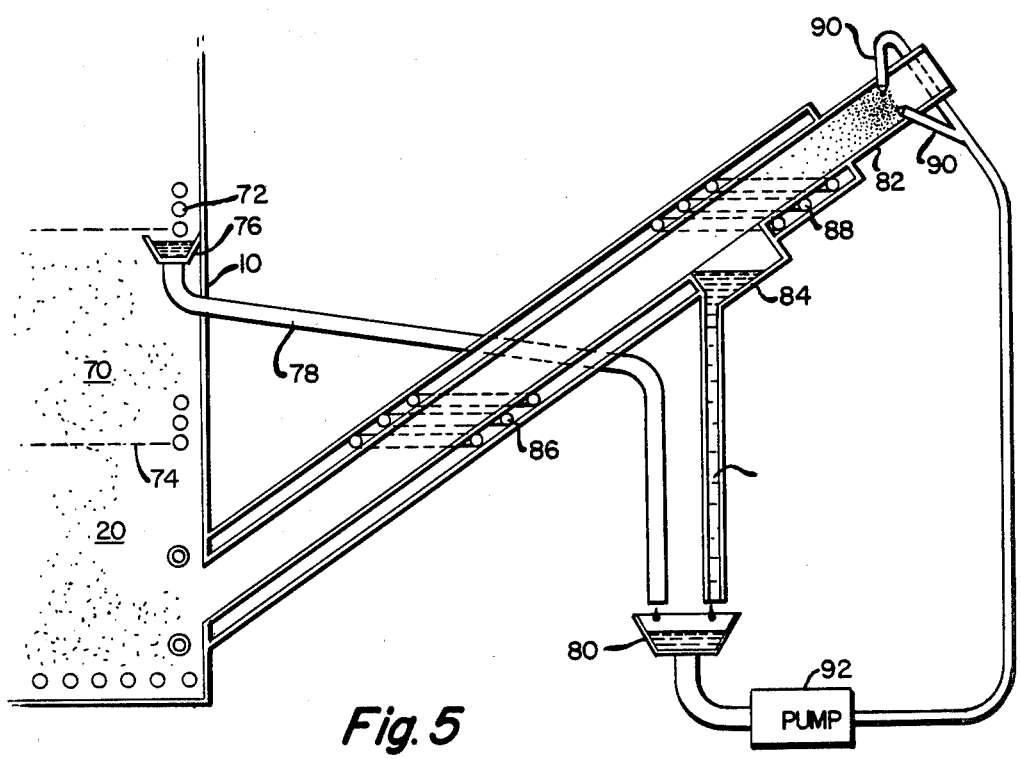
FIG. 5 is a cutaway sectional elevation view of an embodiment of the invention having an upwardly inclined conduit and a secondary vapor in the vessel and conduit.

A further embodiment is shown in FIG. 5 as adapted to a dual vapor system. The vessel 10 includes a first vapor 20 within a processing zone as described above, and a second vapor 70 disposed above the primary vapor. Cooling coils 72 cool the secondary vapor and maintain this secondary vapor within a defined zone above the primary vapor zone, with a boundary or interface, illustrated by reference 74, existing between the two vapor zones. Secondary vapor condensed by action of the cooling coil 72 is collected by a trough 76 and directed by a pipe 78 to a reservoir 80. The conduit 82 in this embodiment extends upwardly from the vessel and includes a sump 84 with an outlet pipe 87 for returning condensed secondary vapor to the reservoir 80. Primary cooling coils 86 are disposed along a portion of conduit 82, and cooling coils 88 are disposed around the conduit 82 at a position outward of the primary coils 86 and at the height of the secondary zone 70. Spray nozzles 90 are disposed within the conduit at a position outward from the cooling coils 88, these nozzles being fed by a pump 92 supplied by condensate from reservoir 80.

Primary vapor entering the conduit 82 from the primary vapor zone of the vessel is condensed by cooling coils 86, the condensing vapor flowing back into the vessel. Secondary vapor condensate collected in reservoir 80 is applied as a fine spray or mist by nozzles 90 which are directed inwardly of the conduit 82. This mist serves as a liquid seal to further contain the vapor within the conduit. The spray seal can also be employed in the embodiments described above.

The invention thus described is operative to minimize to a substantial degree the loss of vapor from the processing system while maintaining an open system for continuous throughput of a product to be processed within the vessel. The vapor loss from the open conduits can be less than the loss which occurs in conventional dual vapor systems. Moreover, the small vapor loss of the novel system does not vary to any appreciable extent with the inclination of the conduits in relation to the vessel. In embodiments where the conduits are inclined, an inclination in the range of 5°–10° from the horizontal is typical. The entrance conduit and exit conduit can each be disposed in an upward inclination, a downward inclination, or horizontal disposition, and the disposition of each conduit need not be the same as the other. Accordingly, the invention is not to be limited by what has been particularly shown and described except as indicated in the appended claims.

What is claimed is:

1. A continuous vapor phase processing system of the type wherein work is selectively heated by a processing vapor in a processing vapor zone to a preselected temperature for vapor phase processing, comprising:

a vessel containing a processing vapor in a processing vapor zone, a first aperture in the vessel side wall within the vapor zone and below the upper level of the processing vapor zone and by which a work product is introduced into the processing vapor, and a second aperture in the confronting vessel side wall within the vapor zone and below the upper level of the processing vapor zone and by which a work product is removed from the processing vapor;

a first conduit in communication with the first aperture and extending outwardly from the vessel side wall and having an outer end open to the atmosphere;

a second conduit in communication with the second aperture and outwardly extending from the confronting vessel side wall and having an outer end open to the atmosphere;

each of said conduits having a cross-section and a length selected to allow passage of a work product therethrough and to provide an intended flow resistance to impede the outward flow of the processing vapor in the conduit and significantly prevent the exit thereof to the atmosphere;

first means associated with each of said apertures for cooling the region of the vessel adjacent the apertures to below the condensation temperature of the processing vapor to prevent significant processing vapor from entering respective conduits;

second means respectively disposed on and extending along at least a portion of the length of said conduits for cooling the processing vapor therein to below the condensation temperature therefor to significantly prevent said processing vapor from exiting the conduits to the atmosphere;

means for conveying a work product through said first conduit into the processing vapor zone of said vessel and out of the vessel through said second conduit; and said first and second conduits being substantially in alignment on respective sides of the vapor zone of the vessel to provide substantially straight-through conveyance of the work product through the first conduit into the processing zone of the vessel and out of the vessel through the second conduit.

2. The system of claim 1 wherein said first cooling means includes cooling coils disposed at each of the apertures to cause condensation of processing vapor thereon and minimize the flow of processing vapor from the vessel into the conduits.

3. The system of claim 2 wherein said first cooling means includes a cooling coil in the vapor zone of the vessel around each of the apertures.

4. The system of claim 1 wherein said second cooling means includes cooling coils along and within each conduit to cause condensation of processing vapor therein and prevention of significant processing vapor loss from the outer ends of the conduits to the atmosphere.

5. The system of claim 1 wherein each of said conduits has a preselected length and a preselected cross-section to provide an intended flow resistance to impede the outward flow of processing vapor along the conduit and to allow the cooling of the processing vapor along the conduit length.

6. A continuous vapor phase processing system of the type wherein a work product is selectively heated by a processing vapor in a processing vapor zone to a preselected temperature for vapor phase processing, comprising:

a vessel containing a processing vapor zone having a processing vapor therein, a first aperture in the vessel side wall within the vapor zone and below the upper level of the processing vapor zone and by which a work product is introduced into the processing vapor, and a second aperture in the confronting vessel side wall within the vapor zone and below the upper level of the processing vapor zone and by which a work product is removed from the processing vapor;

a first conduit in communication with the first aperture and outwardly extending from the vessel side wall and having an outer end open to the atmosphere;

a second conduit in communication with the second aperture and outwardly extending from the confronting vessel side wall substantially in alignment with the first conduit and having an outer end open to the atmosphere;

first means positioned proximate to each of said apertures for cooling said processing vapor to below the condensation temperature of said vapor to minimize the flow of said processing vapor from the vessel into the conduits;

second means positioned along at least a portion of the length of the first and the second conduits outwardly of said first means for cooling said processing vapor in said conduits to below the condensation temperature of said processing vapor to prevent significant vapor loss from the outer end of the conduits to the atmosphere;

means for conveying a work product through said first conduit to the processing zone of said vessel and out of the vessel through said second conduit; and each of said conduits having a length and a cross-section selected to allow work product passage and to provide an intended flow resistance to the primary processing vapor therein to minimize the flow of the primary vapor therealong to significantly prevent the exit thereof to the atmosphere.

7. The system of claim 6 wherein each of said conduits includes:

a channel extending throughout the length of the conduit between the aperture in the vessel wall and the atmosphere and configured to allow passage of a work product therethrough;

at least one recessed channel in the bottom wall of the conduit to accommodate a conveyor belt; and wherein said conveying means includes a conveyor belt disposed for movement in the recessed channel of the conduit for transport of a work product through the conduit.

8. The system of claim 6 wherein said conveying means includes:

at least one conveyor belt disposed in the first conduit and operative to transport a work product therethrough into the processing vapor zone of the vessel;

at least one conveyor belt in the processing vapor zone of the vessel and operative to transport a work product from the first conduit to the second conduit; and at least one conveyor belt disposed in the second conduit and oeprative to transport a work product from the processing vapor zone through the second conduit.

9. The system of claim 6 wherein said conveying means includes:

a plurality of spaced parallel conveyor belts disposed in the first conduit and movable in a closed path within the first conduit about first and second shafts at respective ends of the first conduit;

a plurality of spaced parallel conveyor belts disposed in the second conduit and movable in a closed path within the second conduit about third and fourth shafts at respective ends of the second conduit;

a plurality of spaced parallel conveyor belts disposed in the spaces provided by the spaced belts of the first and second conduits and movable in a closed path about the first and third shafts;

all of said belts being driven in unison to transport the work product in a path through the first conduit, through the processing vapor zone, and through the second conduit.

10. The system of claim 6 wherein the first and second conduits are upwardly inclined from the vessel.

11. The system of claim 6 wherein the first and second conduits are downwardly inclined from the vessel.

12. The system of claim 11 wherein each of the conduits includes a sump in the bottom of the conduit at a position outward from the vessel for collecting condensed vapor therein; and
   means for returning the condensed vapor from the sump to the vessel.

13. A continuous vapor phase processing system, comprising:
   a vessel containing a primary processing vapor in a processing vapor zone and a secondary vapor in a secondary vapor zone above the processing vapor zone;
   a first conduit outwardly extending from one side wall of the vessel and having an inner end in communication with the processing vapor and below the upper level of the processing vapor zone and an outer end open to the atmosphere;
   a second conduit outwardly extending from the opposite side wall of the vessel substantially in alignment with the first conduit and having an inner end in communication with the processing vapor and below the upper level of the processing vapor zone and an outer end open to the atmosphere;
   first means at the inner end of each of said conduits for cooling said primary vapor to below the condensation temperature therefor to minimize the flow of said primary processing vapor from the vessel into the conduits;
   second means extending along at least a portion of the length of each of said conduits, outwardly of said first means, for cooling said primary processing vapor to below the condensation temperature therefor to minimize the flow of said primary processing vapor in respective conduits to the atmosphere;
   third means disposed along each of said conduits, outwardly of said second means, for cooling said secondary vapor within said conduits to a temperature below the condensation temperature therefor to minimize the flow thereof to the atmosphere and to provide a secondary vapor seal for the primary vapors; and
   each of said conduits having a preselected length and cross-section selected to allow work product passage therethrough and to provide an intended flow resistance to the vapors therein to minimize the exit thereof to the atmosphere.

14. The system of claim 13, further including means for providing a spray of secondary liquid near the outer end of the conduit to provide a liquid seal in the conduit for containment of vapor therein.

15. The system of claim 13 including means for collecting condensed secondary vapor in each conduit for return to the vessel.

16. The system of claim 13 wherein said first cooling means at each of the apertures includes a cooling coil in the vapor zone of the vessel and around each of the apertures.

17. A continuous vapor phase processing system of the type wherein work is selectively heated by a processing vapor to a preselected temperature for vapor phase processing, comprising:
   a vessel containing a processing vapor is a processing vapor zone and having a first aperture in the vessel side wall within the processing vapor and below the upper level of the processing vapor by which a work product is introduced into the processing vapor for vapor phase processing, and having a second aperture in the confronting vessel side wall within the processing vapor below the upper level of the processing vapor by which a work product is removed from the processing vapor after vapor phase processing;
   a first conduit in communication with the first aperture and extending generally outwardly from the vessel side wall and having an outer end open to the atmosphere;
   a second conduit in communication with the second aperture and extending generally outwardly from the confronting vessel side wall substantially in alignment with the first conduit and having an outer end open to the atmosphere;
   each of said conduits having a preselected cross-section selected to just allow passage of a work product therethrough and a preselected length selected to provide an intended flow resistance to the processing vapor in the conduits or preventing significant processing vapor flow therealong;
   means associated with each of said conduits for condensing the primary vapor to below the condensation temperature therefor to prevent significant vapor loss from the outer end of the conduits to the atmosphere; and
   means for conveying a work product through said first conduit into the processing vapor and through said second conduit out of the vessel.

* * * * *